United States Patent
Lee et al.

(10) Patent No.: US 7,112,051 B2
(45) Date of Patent: Sep. 26, 2006

(54) QUICK CLAMPING DEVICE

(75) Inventors: Jung-Chou Lee, Taichung (TW); Tony Yu, Dong-Guan (CN); James Bian, Dong-Guan (CN); Chi-Chin Fu, Dong-Guan (CN)

(73) Assignee: Asia Optical Co., Inc., Taichung (TW)

( * ) Notice: Subject to any disclaimer, the term of this patent is extended or adjusted under 35 U.S.C. 154(b) by 168 days.

(21) Appl. No.: 10/866,502

(22) Filed: Jun. 10, 2004

(65) Prior Publication Data
US 2005/0153009 A1   Jul. 14, 2005

(30) Foreign Application Priority Data
Jan. 13, 2004   (TW) .............................. 93100776 A

(51) Int. Cl.
*B29C 33/30*   (2006.01)
(52) U.S. Cl. ..................... 425/192 R; 425/195; 269/94
(58) Field of Classification Search ........... 425/192 R, 425/193, 195; 269/94
See application file for complete search history.

(56) References Cited

U.S. PATENT DOCUMENTS

| 4,265,297 A | * | 5/1981 | Asakuma et al. ........... 164/303 |
| 4,365,792 A | * | 12/1982 | Johns .......................... 269/24 |
| 4,506,871 A | * | 3/1985 | Yonezawa .................... 269/29 |
| 4,544,340 A | * | 10/1985 | Hehl ........................... 425/183 |
| 4,598,574 A | * | 7/1986 | Hegel et al. ................ 72/481.4 |
| 4,976,602 A | * | 12/1990 | Yamazaki .................... 425/188 |
| 5,118,269 A | * | 6/1992 | Klose et al. .................. 425/47 |
| 5,206,038 A | * | 4/1993 | Yonezawa ................ 425/450.1 |
| 5,588,642 A | * | 12/1996 | Yonezawa .................... 269/244 |

FOREIGN PATENT DOCUMENTS

| DE | 32 01 025 | * | 8/1983 |
| JP | 56-109152 | * | 8/1981 |
| JP | 3-146231 | * | 6/1991 |
| JP | 3-216255 | * | 9/1991 |

* cited by examiner

*Primary Examiner*—James P. Mackey
(74) *Attorney, Agent, or Firm*—Townsend and Townsend and Crew LLC

(57) ABSTRACT

A quick clamping device includes a main body adapted to be mounted on a mold holder, a clamp piece including first and second arm sections and pivoted to the main body between the first and second arm sections, a wedge body mounted movably on the main body below the second arm section, and a driving unit connected to the wedge body. The first arm section has a press end adapted to clamp a mold unit against the mold holder. The wedge body is movable between a first position, in which the wedge body lifts the second arm section so as to move downward the press end toward the mold unit, and a second position, in which the wedge body moves away from the first position.

2 Claims, 6 Drawing Sheets

QUICK CLAMPING DEVICE

CROSS-REFERENCE TO RELATED APPLICATION

This application claims priority of Taiwanese Application No. 093100776, filed on Jan. 13, 2004.

BACKGROUND OF THE INVENTION

1. Field of the Invention

The invention relates to a clamping device for a mold unit, more particularly to a clamping device that can quickly clamp a mold unit against a mold holder.

2. Description of the Related Art

Referring to FIG. 1, a conventional injection-molding machine 10 is shown to include an injection unit 12 mounted on one side of a platform 11 of the machine 10, and a mold support 13 mounted on the other side of the platform 11. The mold support 13 includes a stationary mold holder 131, a fixed seat 132 mounted opposite to the stationary mold holder 131, a plurality of parallel guide rods 133 disposed between the stationary mold holder 131 and the fixed seat 132, a movable mold holder 134 mounted slidably on the guide rods 133, and a hydraulic cylinder 16 connected to the fixed seat 132 and the movable mold holder 134. The stationary and movable mold holders 131, 134 have confronting surfaces connected respectively to first and second mold units 151, 152 using a plurality of bolts 14. The first and second mold units 151, 152 cooperate to form a mold set 15 so as to proceed with an injection molding operation.

Although the aforementioned mold support 13 can achieve its intended purpose, in actual use, since the mold units 151, 152 are fixed to the mold holders 131, 134 through the bolts 14, the following disadvantages are encountered:

1. The operation for tightening the bolts 14 is time-consuming.

2. An operator has to exert a relatively large force to tighten the bolts 14.

Another conventional device (not shown) for mounting the mold units 151, 152 on the mold holders 131, 134 includes a plurality of hydraulic die clamps (not shown) provided on each of the stationary and movable mold holders 131, 134. Each of the hydraulic die clamps includes a hydraulic cylinder, a pivot seat, and a lever-type clamp piece connected pivotally to the pivot seat. Through the action of the hydraulic cylinder on the clamp piece, the first and second molding units 151, 152 are clamped, respectively. However, because this kind of conventional clamping device uses the hydraulic cylinder, the following disadvantages are encountered:

1. Increase in auxiliary parts, such as a pump, a control unit, a pressure sensor, a hydraulic pipeline, connectors, etc.

2. Price is expensive.

SUMMARY OF THE INVENTION

Therefore, the object of the present invention is to provide a clamping device that can ensure quick clamping and removal of a mold unit to enhance working efficiency.

According to this invention, a quick clamping device for clamping a mold unit against a mold holder comprises a main body adapted to be mounted on the mold holder, a clamp piece, a wedge body, and a driving unit. The clamp piece includes first and second arm sections, and is pivoted to the main body between the first and second arm sections. The first arm section has a press end adapted to clamp the mold unit against the mold holder. The wedge body is mounted movably on the main body below the second arm section, and is movable between first and second positions. In the first position, the wedge body lifts the second arm section so as to move downward the press end toward the mold unit. In the second position, the wedge body moves away from the first position. The driving unit is connected to the wedge body so as to move the wedge body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
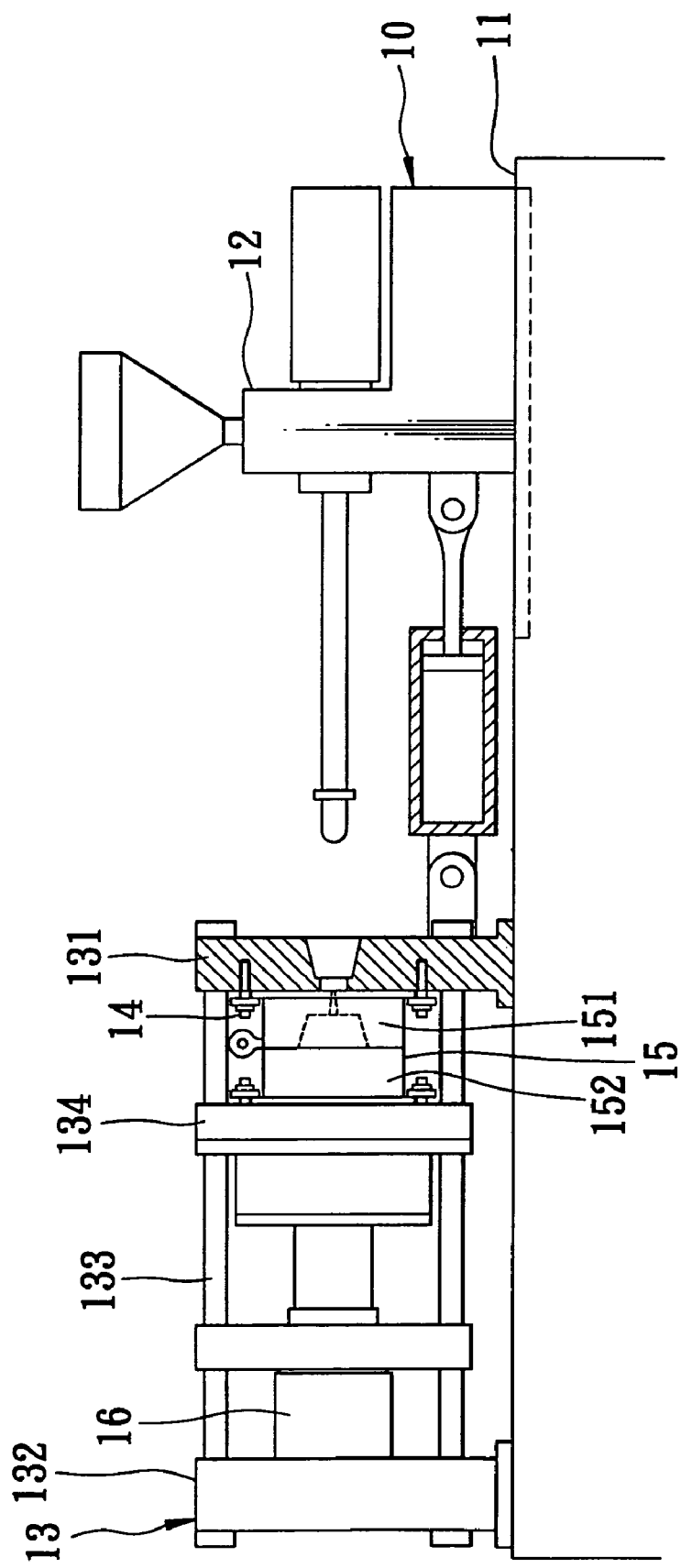
FIG. 1 is a partly sectional schematic view to illustrate a mold support of a conventional injection-molding machine.
Figure 2:
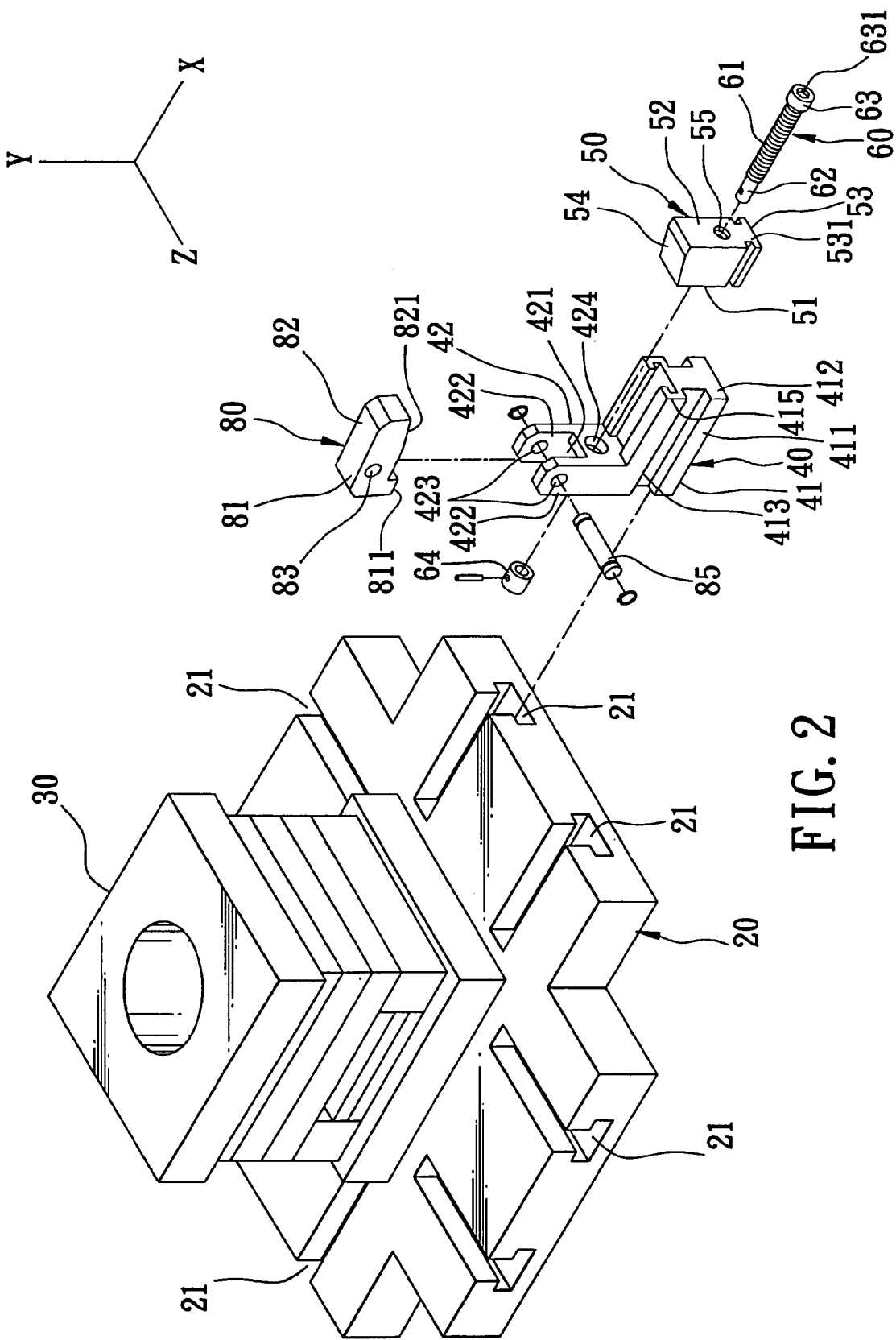
FIG. 2 is an exploded perspective view of the preferred embodiment of a quick clamping device according to the present invention for application to a mold holder.
Figure 3:
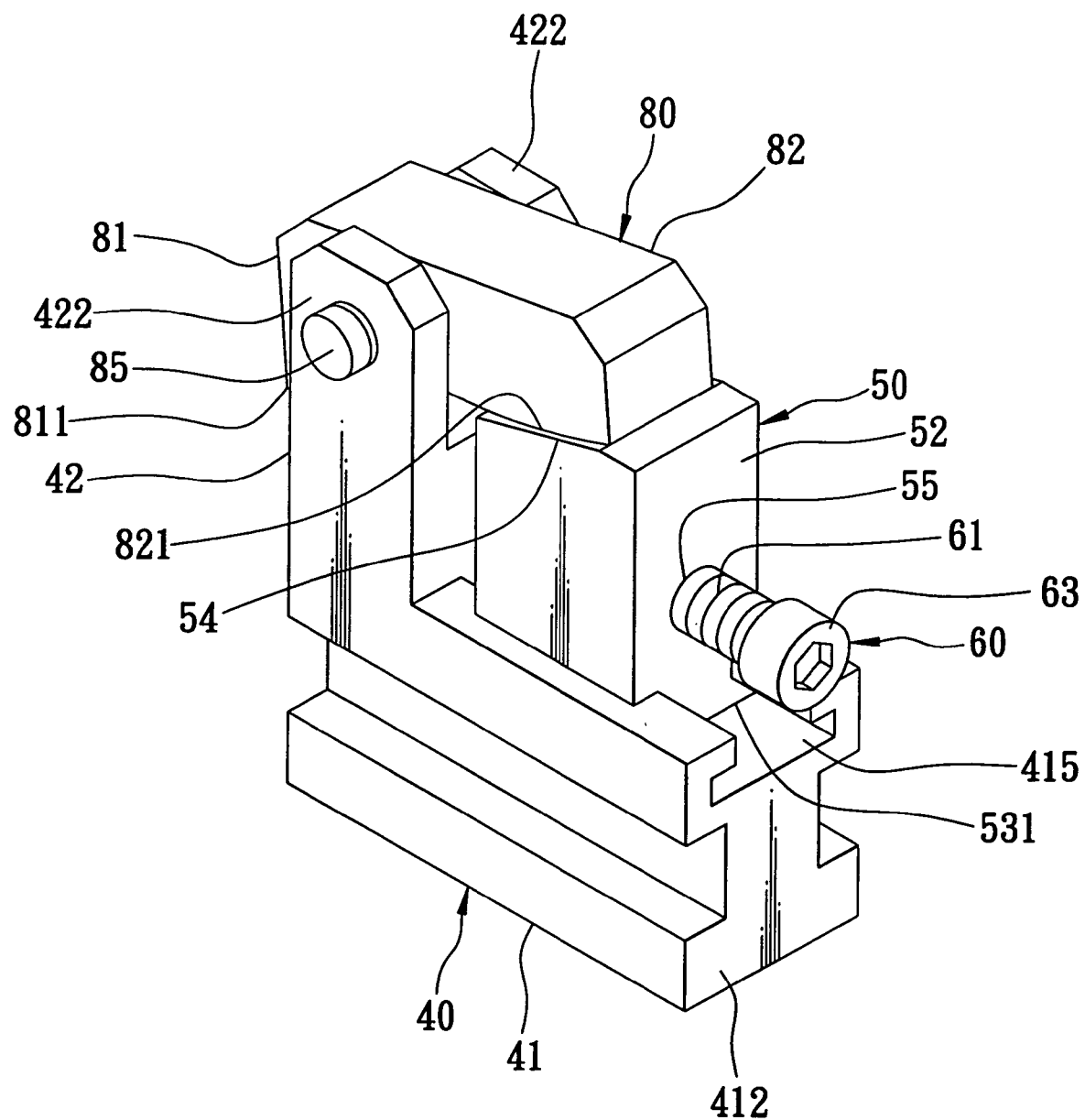
FIG. 3 is a perspective view of the preferred embodiment in an assembled state.

Referring to FIGS. 2 to 6, the preferred embodiment of a quick clamping device according to the present invention is adapted to be mounted on a mold holder 20 for clamping fixedly a mold unit 30 against the mold holder 20. The mold holder 20 can be a stationary or a movable mold holder of a vertical injection-molding machine. Application of the present invention is not limited to the exemplary mold holder 20. The mold holder 20 has a peripheral part formed with a plurality of guide slots 21. Particularly, the mold holder 20 has four spaced-apart guide slots 21 extending along an X-axis, and four spaced-apart guide slots 21 extending along a Z-axis. Each guide slot 21 is formed as a mortise.

The preferred embodiment of the present invention includes a main body 40, a wedge body 50, a driving unit, and a clamp piece 80.

The main body 40 includes a seat portion 41 adapted to be mounted on the mold holder 20, and an upright portion 42 extending upwardly from the seat portion 41 along a Y-axis. The seat portion 41 has a bottom section 411, and a top section 413 extending upwardly and integrally from the bottom section 411. The bottom section 411 has a guide part 412 extending along the X-axis and disposed slidably in the respective guide slot 21 in the mold holder 20. In this embodiment, the guide part 412 is formed as a tenon piece that engages the guide slot 21 in the mold holder 20. The top section 413 has a slide rail 415 extending along the X-axis. The slide rail 415, in this embodiment, is formed as a mortise-like groove. The upright portion 42 is connected integrally to the top section 413, and includes two spaced-apart pivot ears 422, a notch 421 between the pivot ears 422, two pivot holes 423 formed respectively in the pivot ears 422 and extending along the Z-axis, a through hole 424 extending along the X-axis below the notch 421, and a pivot pin 85 extending through the pivot ears 422.

The wedge body 50 is mounted movably on the main body 40, and has a top inclined piece 54, a bottom section 53 opposite to the top inclined piece 54, a front face 51 proximate to the upright portion 42, a rear face 52 opposite to the front face 51, and a screw hole 55 formed through the front and rear faces 51, 52 and extending along the X-axis. The bottom section 53 has a slide member 531 to engage slidably the slide rail 415 in the seat portion 41 of the main body 40. The slide member 531, in this embodiment, is formed as a tenon piece corresponding to the mortise-like groove of the slide rail 415. When the slide member 531 is slid into the slide rail 415, the wedge body 50 cannot rotate relative to the main body 40, and can only move slidably along the slide rail 415.

The clamp piece 80 includes a first arm section 81 and a second arm section 82 opposite to the first arm section 81 along the X-axis, and a pin hole 83 disposed between the first and second arm sections 81, 82 and extending along the Z-axis. The first arm section 81 has a press end 811 to press against the mold unit 30. The second arm section 82 has a bottom face 821 to contact the top inclined face 54 of the wedge body 50.

To assemble the clamp piece 80 on the main body 40, the clamp piece 80 is first disposed in the notch 421 in the upright portion 42, after which the pivot pin 85 is inserted through the pivot holes 423 in the upright portion 42 and the pin hole 83 in the clamp piece 80 so that the clamp piece 80 is pivoted to the upright portion 42 between the first and second arm sections 81, 82. At this time, the press end 811 and the bottom face 821 protrude outwardly from the upright portion 42 in opposite directions.

The driving unit is connected threadedly to the wedge body 50, and includes a driving screw 60 engaged threadedly to the screw hole 55 in the wedge body 50 so as to drive movement of the wedge body 50 between first and second positions. In the first position, the wedge body 50 is moved toward the upright portion 42 so as to lift the second arm section 821 and so as to lower the press end 811 of the clamp piece 80 toward the mold unit 30. In the second position, the wedge body 50 moves away from the first position, that is, away from the upright portion 42, so that the press end 811 of the clamp piece 80 is moved away from the mold unit 30.

The driving screw 60 has a threaded section 61, a non-threaded section 62, and an operating section 63. The threaded section 61 engages threadedly the screw hole 55. The non-threaded section 62 extends from one end of the threaded section 61, and extends outwardly of the front face 51 of the wedge body 50 and out of the through hole 424 in the main body 40. A stop member 64, in the form of a sleeve, is provided at and is sleeved fixedly on one end of the non-threaded section 62 so as to prevent removal of the driving screw 60 from the upright portion 42. The operating section 63 extends from the other end of the threaded section 61 opposite to the non-threaded section 62, and extends outwardly of the rear face 52 of the wedge body 50. The operating section 63 has a hexagonal hole 631 for insertion of a tool (not shown) therein when it is desired to rotate the driving screw 60.

Figure 4:
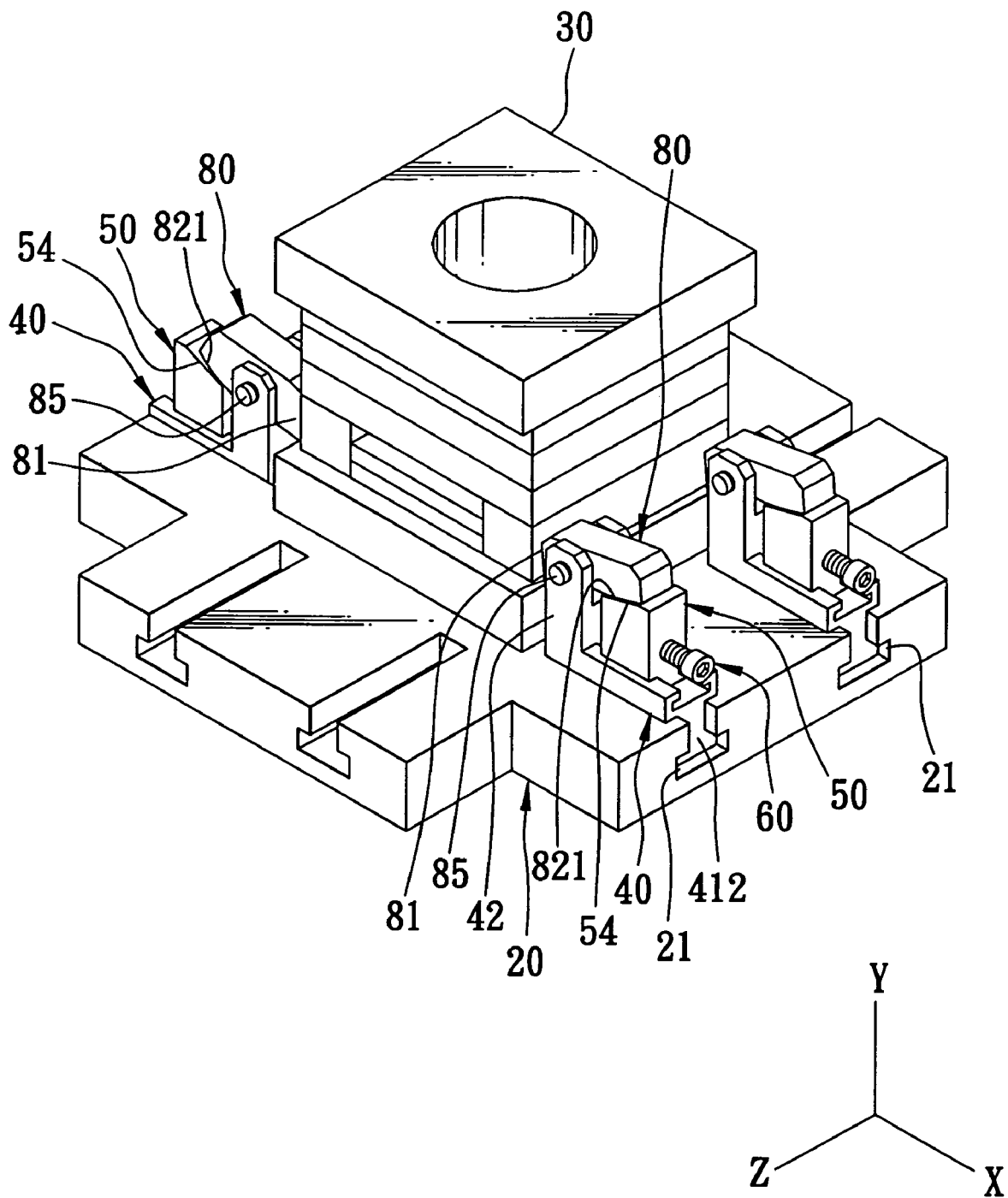
FIG. 4 is a perspective view, illustrating the preferred embodiment in a state of use.

In use, the main bodies 40 of clamping devices of the present invention are slid respectively into the guide slots 21 in the mold holder 20, as illustrated in FIG. 4. A tool, such as an impact driver (not shown), is used to rotate the driving screw 60 so as to move the wedge body 50 slidably towards the upright portion 42. The top inclined face 54 of the wedge body 50 pushes the bottom face 821 of the clamp piece 80 upwardly, thus pivoting the clamp piece 80 about the pivot pin 85, until the press end 811 of the clamp piece 80 presses against the mold unit 30, thereby clamping quickly the mold unit 30 against the mold holder 20. At this time, the front face 51 of the wedge body 50 is proximate to the upright portion 42, and the top inclined face 54 is located below the second arm section 82 of the clamp piece 80.

To remove the mold unit 30 from the mold holder 20, the driving screw 60 is rotated using the same tool so as to move the wedge body 50 away from the upright portion 42. Simultaneously, the clamp piece 80 pivots about the pivot pin 85 so that the press end 811 is raised and moves away from the mold unit 30, thereby releasing the mold unit 30. As such, the mold unit 30 can be quickly removed from the mold holder 20.

Figure 5:
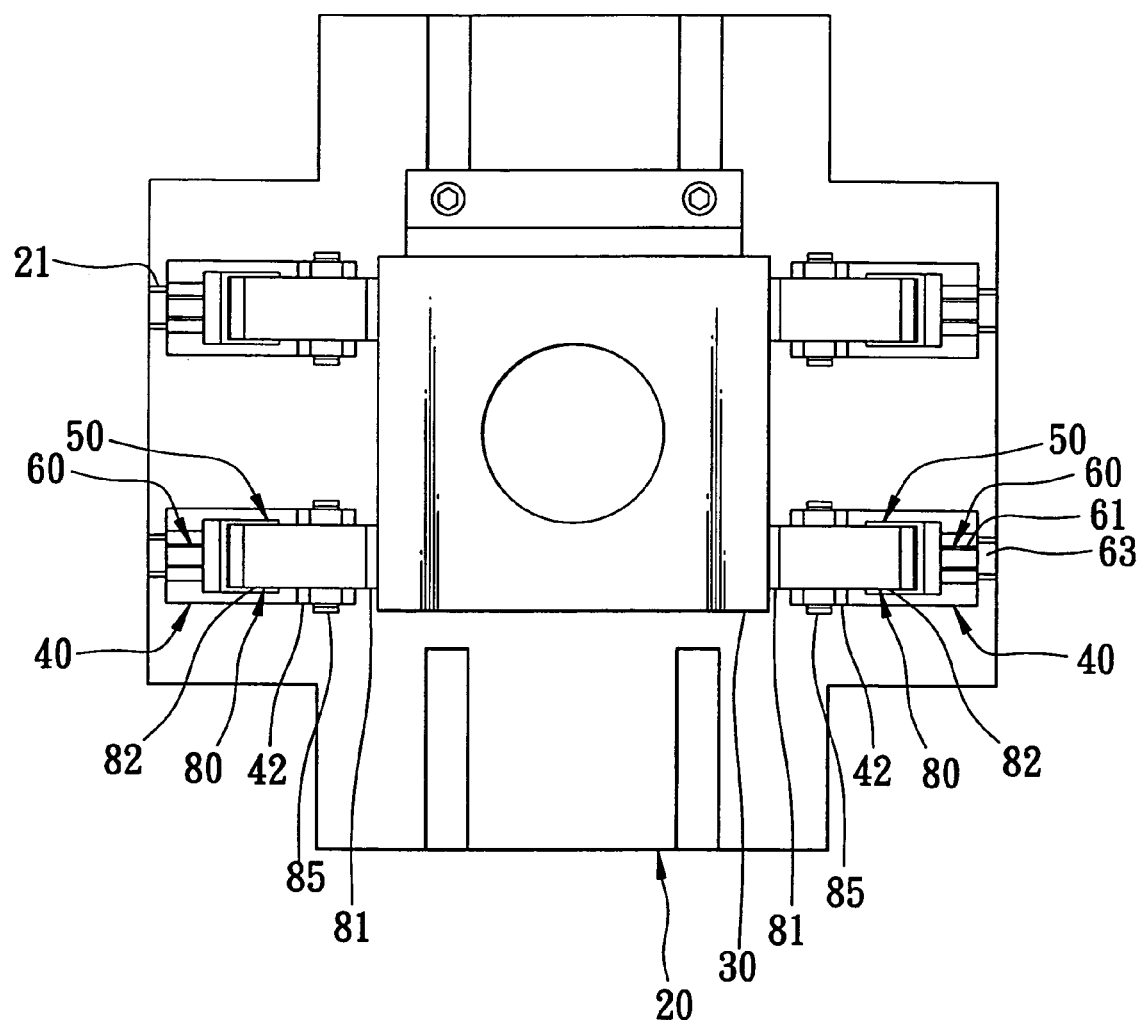
FIG. 5 is a schematic top view of FIG. 4.
Figure 6:
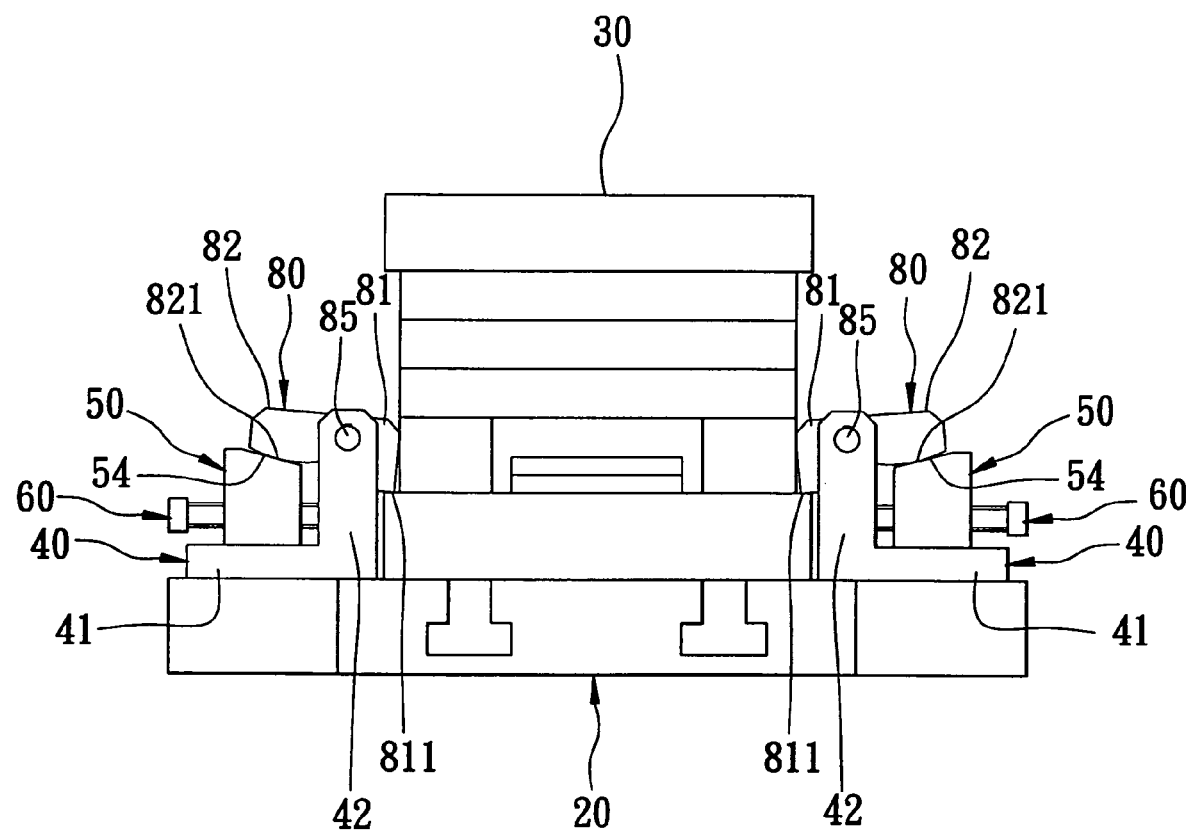
FIG. 6 is a schematic side view of FIG. 4.

Thus, when the press ends 811 of the clamping devices of the present invention press simultaneously against the mold unit 30, as best shown in FIGS. 5 and 6, the mold unit 30 can be clamped securely against the mold holder 20.

From the aforementioned description of the preferred embodiment, the advantages of the present invention can be summarized as follows:

Because it is only required to rotate the driving screw 60 so as to pivot the clamp piece 80, which in turn enables the press end 811 to clamp and release the mold unit 30, the mold unit 30 can be quickly clamped to and removed from the mold holder 20 such that operation of the present invention is relatively convenient and time-saving, and can enhance working effeciency.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A quick clamping device for clamping a mold unit against a mold holder, comprising:

a main body adapted to be mounted on the mold holder, and having a mortise;

a clamp piece including a first arm section and a second arm section, and pivoted to said main body between said first and second arm sections, said first arm section having a press end adapted to clamp the mold unit against the mold holder;

a wedge body mounted movably on said main body below said second arm section, said wedge body being movable between a first position, in which said wedge body lifts said second arm section so as to move downward said press end toward the mold unit, and a second position in which said wedge body moves away from said first position, said wedge body having a tenon engaging slidably said mortise to guide movement between said first and second positions; and a driving unit connected to said wedge body and including a driving screw that engages threadedly said wedge body to drive movement of said wedge body;

wherein said main body includes a seat portion adapted to be mounted on the mold holder, and an upright portion extending upwardly from said seat portion, said mortise being formed in said seat portion, said clamp piece being pivoted to said upright portion, and said wedge body being moved toward said upright portion in said first position;

wherein said upright portion includes two spaced-apart pivot ears, a notch between said pivot ears for receiving said clamp piece, and a pivot pin extending through said pivot ears and said clamp piece;

wherein said main body further has a through hole, said wedge body having a screw hole, said driving screw passing threadedly through said screw hole and extending through said through hole;

wherein said driving screw has a threaded section engaged threadedly to said screw hole, and a non-threaded section extending through said through hole, said non-threaded section having one end extending out of said through hole and provided with a stop member.

2. The quick clamping device as claimed in claim 1, wherein said stop member is formed as a sleeve fixed to said one end of said non-threaded section.

* * * * *